May 14, 1929.   E. C. LITCHFIELD ET AL   1,713,389
FERTILIZER DISTRIBUTOR
Filed Aug. 14, 1925      2 Sheets-Sheet 1

INVENTORS:
E C Litchfield
Viktor Speer
BY
W. F. Freudenreich
ATTORNEY

Patented May 14, 1929.

1,713,389

UNITED STATES PATENT OFFICE.

EDGAR C. LITCHFIELD AND VICTOR SPEER, OF CEDAR FALLS, IOWA; SAID SPEER ASSIGNOR TO LITCHFIELD MANUFACTURING COMPANY, A CORPORATION OF IOWA.

FERTILIZER DISTRIBUTOR.

Application filed August 14, 1925. Serial No. 50,184.

The present invention relates to that class of farm machinery that serves to distribute fertilizer from a wagon body as the latter travels over a field; and has for its object to produce a simple and efficient machine for distributing mineral fertilizers continuously and without requiring the operator to exert himself further than to drive the machine.

The widest use for machines of this general type lies in the distribution of barnyard manure, a large percentage of farmers owning so-called manure spreaders. Certain types of these spreaders, with a few additional attachments, may be converted into distributors of mineral fertilizers; and, viwed in one of its aspects, the present invention may be said to have for its object to produce a simple and novel set of attachments for a well known type of manure spreader, whereby the latter may readily, and at small expense, be converted into a spreader of mineral fertilizer when not employed in the ordinary way.

Figure 1:
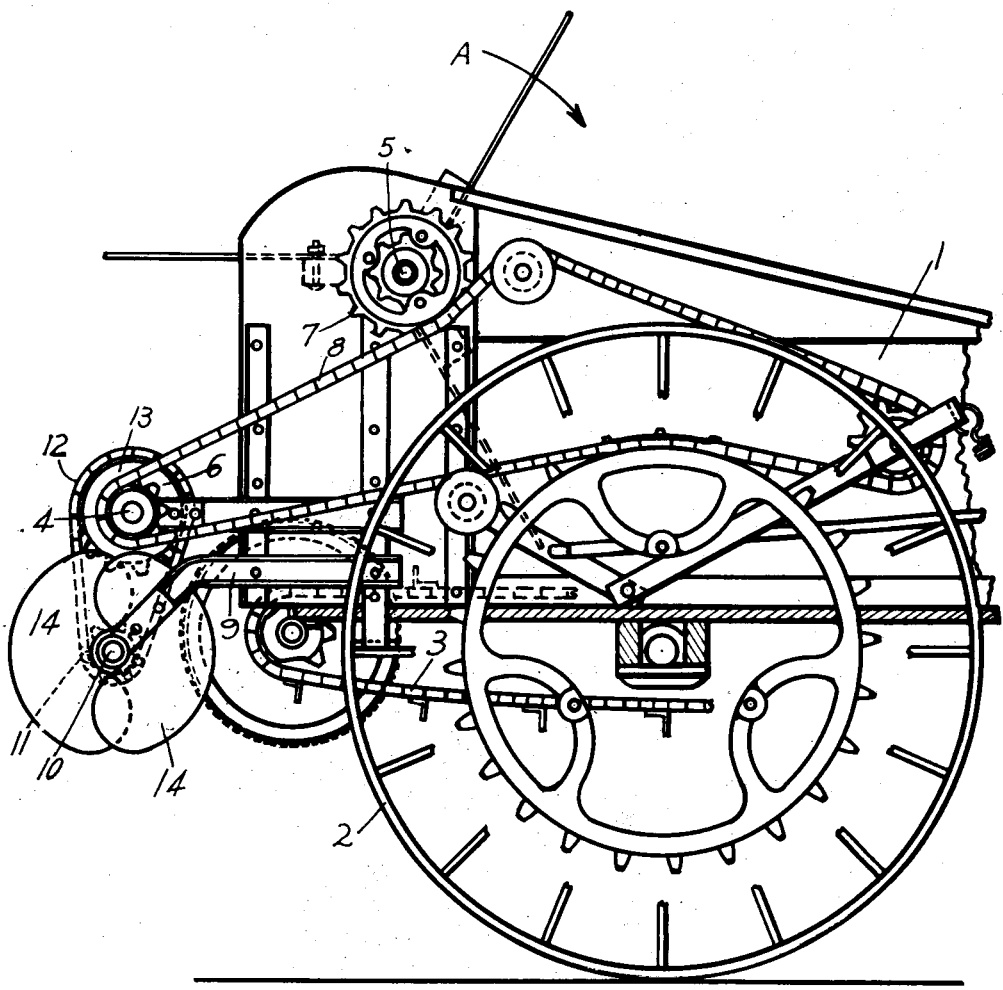
Figure 2:
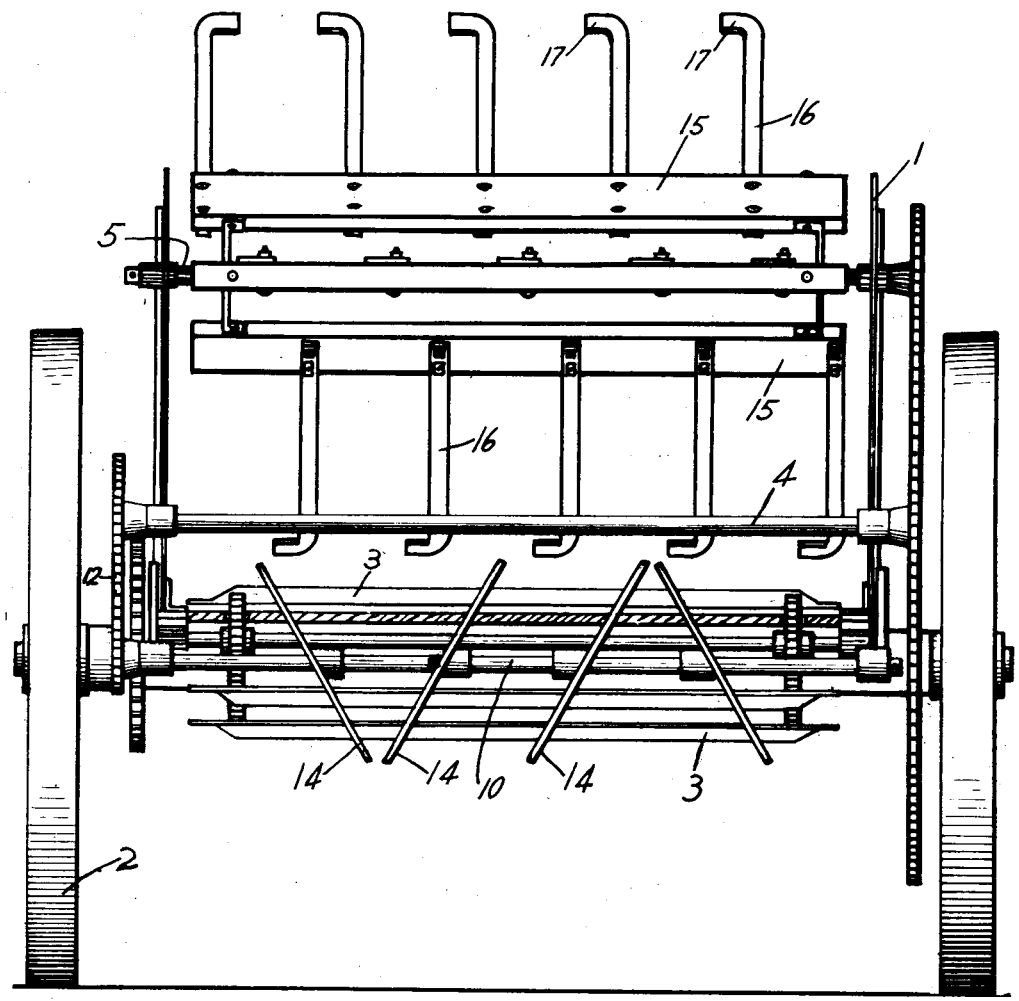

Various features of novelty whereby our invention is characterized will hereinafter be pointed out with particularity in the claims; but, for a full understanding of our invention and of its various objects and advantages, including those heretofore enumerated, reference may be had to the following detailed description taken in connection with the accompanying drawings, wherein:

Figure 1 is a side elevation of the rear end of a well known type of manure spreader, equipped in accordance with the present invention and Fig. 2 is a rear view of the spreader.

Referring to the drawings, 1 represents the body of a manure spreader supported on wheels of which only the rear wheels, 2, 2, are shown. The bottom of the wagon body is formed of or contains any usual or suitable apron 3 that feeds the contents of the wagon body slowly toward the rear. Supported behind the wagon body, somewhat above the bottom though, is a transverse shaft 4 that ordinarily carries the lower beater wheel. Within the rear end of the wagon body, near the top thereof, is the transverse shaft 5 that ordinarily carries the upper beater wheel. On the shaft 4 is a sprocket wheel 6, and on the shaft 5 is a sprocket wheel 7. An endless sprocket chain 8, driven in any suitable way from one of the rear wheels of the wagon, has a section passing under the sprocket wheel 7 and over the sprocket wheel 4 so that, when the spreader is moving ahead, the shaft 5 is rotated in the direction of the arrow A in Fig. 1, while the shaft 4 is rotated in the opposite direction.

Extending rearwardly from the sides of the wagon body, in the vicinity of the bottom, and then downwardly, are a pair of stationary arms 9 between the rear ends of which is supported a transverse shaft 10; this shaft lying below shaft 4, and at some distance below the effective bottom of the wagon body. Fixed to the shaft 10 is a sprocket wheel 11, around which passes a sprocket chain 12 that runs over a sprocket wheel 13 secured to shaft 4. Therefore, when the spreader is moving ahead, the shaft 10 rotates in the same direction as the shaft 4. Distributed along the shaft 10 are inclined half disks or blades 14 that constitute a broadcast spreading means.

The shaft 10 is removed when the machine is being used as a manure spreader, but, when the machine is to be converted into a distributor of mineral fertilizer the lower beater wheel is removed from the shaft 4, and the broadcast spreader shaft 10 is placed in position. Also, the bars of the upper beater wheel are removed and, in their place, are fastened other bars 15 having thereon long spring fingers that may be in the form of flat blades 16, preferably of tempered spring steel; each bar having a plurality of these fingers or blades distributed along the same, and the distribution of the blades on the several bars being different, so that the circular paths traveled by the blades are equal in number to the whole number of blades. The blades are radial to the shaft 5 and are of such a length that when they occupy vertical positions below the shaft their lower ends lie close to the movable apron. In order to reduce the number of blades necessary to cause their outer ends to sweep through approximately a continuous cylindrical surface, the outer ends of the blades are bent laterally, as indicated at 17, thus increasing the effective width of the outer end of each blade.

It will be seen that the sprocket wheel ratios are such that the shaft 5 rotates very slowly compared to the speed of rotation of shaft 10. In other words, as the machine travels over the ground, the upper shaft is turned slowly, scraping the fertilizer from the front face of the advancing mass and sweeping it rearwardly into the broadcasting element which is rotating rapidly; in the arrangement shown, in a direction to carry the fertilizer upwardly and rearwardly over the same. The inclination of the disks or half disks insures that practically all of the rearwardly moving fertilizer reaching the broadcasting element will be engaged by a surface on the latter, so that the ultimate distribution of the fertilizer is by the broadcasting device. The action, it will be seen, is different from that in the ordinary manure spreader, because the rotating blades serve rather to sweep the fertilizer rearwardly and downwardly into the broadcasting element than to exert a distributing action as is done by the beater wheels of a manure spreader.

We have employed a machine such as we have illustrated, to distribute fine pulverized lime rock, both wet and dry, and also marl, which ordinarily contains more or less large rock-like chunks as much as three or four inches in diameter. Sometimes the blades will catch on the large pieces or rocks but, being of spring metal, they bend until released from the obstruction and then spring back into shape.

We claim:

1. The combination with a vehicle body having a bottom arranged to move the contents toward the rear of a rotatable broadcast spreader mounted at and below the rear end of said body, a rotatable sweep arranged in the rear end of said body near the top thereof, and having yieldable resilient fingers long enough to pass close to the bottom of the body when the sweep is rotated, and means for slowly rotating the sweep to a direction to scrape material from the advance face of the contents of the body downwardly, and at the same time rotating the broadcast spreader rapidly in the opposite direction.

2. A sweep for a fertilizer distributor, comprising a long rotatable core and a series of yieldable resilient blades projecting radially therefrom and distributed around and along said core, said blades being flat and being arranged with their broad faces parallel with the longitudinal elements of said core.

3. A sweep for a fertilizer distributor, comprising a long rotatable core and a series of resilient elements projecting radially therefrom and distributed around and along the core, said elements having their outer ends extended laterally to increase their effective widths in the direction of the length of the sweep.

4. The combination with a vehicle body having means slowly to feed the contents thereof toward the rear when the vehicle is moving ahead, of a sweep arranged within the vehicle body and comprising a long transverse rotatable core and a series of yieldable resilient fingers projecting radially from and distributed around the core, the fingers being long enough to pass close to the bottom of the body when the sweep is rotated, and power means for rotating said sweep in a direction to cause the sweep to scrape material downward from the advancing face of the oncoming load.

In testimony whereof, we sign this specification.

EDGAR C. LITCHFIELD.
VICTOR SPEER.